US011927446B2

(12) United States Patent
Chen et al.

(10) Patent No.: US 11,927,446 B2
(45) Date of Patent: Mar. 12, 2024

(54) NAVIGATION AND POSITIONING SYSTEM FOR UNDERWATER GLIDER AND UP FLOATING ERROR CORRECTION METHOD

(71) Applicant: SOUTHEAST UNIVERSITY, Nanjing (CN)

(72) Inventors: Xiyuan Chen, Nanjing (CN); Junwei Wang, Nanjing (CN); Ping Yang, Nanjing (CN); Lin Fang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 783 days.

(21) Appl. No.: 17/040,543

(22) PCT Filed: Mar. 12, 2019

(86) PCT No.: PCT/CN2019/077887
§ 371 (c)(1),
(2) Date: Sep. 23, 2020

(87) PCT Pub. No.: WO2019/242336
PCT Pub. Date: Dec. 26, 2019

(65) Prior Publication Data
US 2021/0041240 A1 Feb. 11, 2021

(30) Foreign Application Priority Data
Jun. 22, 2018 (CN) .......................... 201810647904.1

(51) Int. Cl.
G01C 21/00 (2006.01)
B63B 79/10 (2020.01)
(Continued)

(52) U.S. Cl.
CPC ............ G01C 21/165 (2013.01); B63B 79/10 (2020.01); B63G 8/001 (2013.01); G01C 21/20 (2013.01);
(Continued)

(58) Field of Classification Search
CPC ...... G01C 21/165; G01C 21/20; B63B 79/10; B63B 2213/00; B63G 8/001;
(Continued)

(56) References Cited

U.S. PATENT DOCUMENTS 11,193,772 B1 * 12/2021 Kinnaman ............. G01C 21/16
2005/0251328 A1 11/2005 Merwe et al.

FOREIGN PATENT DOCUMENTS

CN        1974318 A        6/2007
CN        102519450 A       6/2012
(Continued)

OTHER PUBLICATIONS

Machine Translation of CN102519450A by Chen et al. (Year: 2012).*
(Continued)

Primary Examiner — Anne Marie Antonucci
Assistant Examiner — Jordan T Smith
(74) Attorney, Agent, or Firm — Bayramoglu Law Offices LLC

(57) ABSTRACT

A navigation and positioning system for an underwater glider includes a micro-electro-mechanical system inertial measurement unit, a global positioning system receiving module, a triaxial magnetometer, a Doppler velocimeter, and an integrated navigation hardware processing system. If a navigation and positioning error is too large, the underwater glider stops working in real time and switches from the underwater working state to the up floating error correction state; and when velocity and location errors of a GPS/INS integrated navigation system are smaller than specified thresholds, the underwater glider switches from the up floating error correction state to the underwater working state and continues to work. An H∞ Kalman filter algorithm based on an adaptive multiple fading factor is established to (Continued)

ensure robustness and adaptability of navigation and positioning of a glider.

4 Claims, 2 Drawing Sheets

(51) Int. Cl.
  *B63G 8/00* (2006.01)
  *G01C 21/16* (2006.01)
  *G01C 21/20* (2006.01)
  *G01S 19/49* (2010.01)

(52) U.S. Cl.
  CPC ........... *G01S 19/49* (2013.01); *B63B 2213/00* (2013.01); *B63G 2008/004* (2013.01)

(58) Field of Classification Search
  CPC . B63G 2008/004; G01S 19/49; G01S 19/393; G01S 19/48
  See application file for complete search history.

(56) References Cited

FOREIGN PATENT DOCUMENTS

| | | |
|---|---|---|
| CN | 202382747 U | 8/2012 |
| CN | 106767792 A | 5/2017 |
| CN | 109253726 A | 1/2019 |

OTHER PUBLICATIONS

Jiang, C.; Zhang, S.-B.; Zhang, Q.-Z. Adaptive Estimation of Multiple Fading Factors for GPS/INS Integrated Navigation Systems. Sensors 2017, 17, 1254. (Year: 2017).*

C. M. De Angelis and J. E. Whitney, "Adaptive calibration of an autonomous underwater vehicle navigation system," Oceans 2000 MTS/IEEE Conference and Exhibition. Conference Proceedings (Cat. No.00CH37158), Providence, RI, USA, 2000, pp. 1273-1275 vol. 2, doi: 10.1109/OCEANS.2000.881777. (Year: 2000).*

S. H. Kwak, J. B. McKeon, J. R. Clynch and R. B. McGhee, "Incorporation of global positioning system into autonomous underwater vehicle navigation," Proceedings of the 1992 Symposium on Autonomous Underwater Vehicle Technology, Washington, DC, USA, 1992, pp. 291-297, doi: 10.1109/AUV.1992.225224. (Year: 1992).*

Yanrui Geng et al., Adaptive estimation of multiple fading factors in Kalman filter for navigation applications, GPS Solut, 2008, pp. 273-279, 12.

Yongyuan Qin, Inertial Navigation, May 2016.

* cited by examiner

NAVIGATION AND POSITIONING SYSTEM FOR UNDERWATER GLIDER AND UP FLOATING ERROR CORRECTION METHOD

CROSS REFERENCE TO TILE RELATED APPLICATIONS

This application is the national stage entry of International Application No. PCT/CN2019/077887, filed on Mar. 12, 2019, which is based upon and claims priority to Chinese Patent Application No. 201810647904.1, filed on Jun. 22, 2018, the entire contents of which are incorporated herein by reference.

TECHNICAL FIELD

The present invention belongs to the field of navigation technologies, and relates to a navigation and positioning method of an underwater glider, and specifically to an up floating error correction method of navigation system of an underwater glider. The method enables up floating error correction of the underwater glider to still satisfy navigation requirements under the extremely bad conditions, improves robustness and adaptability of the navigation system, and finally achieves accurate positioning of the underwater glider.

BACKGROUND

An underwater glider is an important tool for ocean exploration and resource development. Motion of the underwater glider is not intensive during a working process, so use of a micro-electro-mechanical system (MEMS) inertial measurement unit (IMU) with low costs, low power consumption, and long endurance is sufficient to meet requirements of navigation and positioning. However, long-time underwater work of a glider and the interference conditions (including ocean current surges, magnetic interference, and the like) will produce large cumulative positioning error. Therefore, the glider needs to float up to the water surface, and use high-precision global positioning system (GPS) signals and a data fusion algorithm to correct errors for its positioning. However, in an up floating error correction process, under the impact of factors such as inclement weather outside, fluctuations of sea waves, and ship shielding, navigation precision of a multi-sensor data fusion algorithm is reduced, and positioning diverges or even fails.

Therefore, how to ensure stability and accuracy of up floating error correction of an underwater glider under the extremely bad conditions has become an important issue in accurate positioning of an underwater glider.

SUMMARY

Invention objective: For a problem that a glider in an up floating error correction state may be affected by factors such as inclement weather outside, fluctuations of sea waves, and ship shielding, an objective of the present invention is to provide a navigation and positioning system for an underwater glider and an up floating error correction method, to ensure robustness and adaptability of navigation and positioning of the glider by using a multi-sensor data fusion algorithm, to overcome the problem that an underwater glider cannot continuously normally work because of reduction of navigation precision and divergence of positioning caused by a conventional integrated navigation algorithm during up floating error correction of the underwater glider under extremely severe conditions, thereby achieving accurate positioning of the underwater glider.

Technical solution: To achieve the foregoing objective, the following technical solutions are used in the present invention:

A navigation and positioning system for an underwater glider is provided, including a micro-electro-mechanical system inertial measurement unit (MEMS-IMU), a global positioning system (GPS) receiving module, a triaxial magnetometer, a Doppler velocimeter (DVL), and an integrated navigation hardware processing system: The MEMS-IMU integrates a triaxial accelerometer and a triaxial gyroscope, and triaxial acceleration and angular rate information are output for obtaining navigation information including an attitude, a velocity, and a location of an underwater glider by using an inertial navigation algorithm; the triaxial magnetometer is configured to correct a heading information error of the glider, and the DVI, is configured to determine a motion state of the underwater glider; the GPS receiving module is combined with the MEWS-PAU to form a loose integrated navigation system for correction of GPS/INS location and velocity errors in an up floating error correction operation, and is configured to correct velocity and location errors of the glider by using an integrated navigation filter algorithm; and the integrated navigation hardware processing system is configured to receive, process, and perform clock synchronization on signals from the triaxial magnetometer, the GPS receiving module, the MEMS-IMU, and the DVL, and perform algorithm calculation of integrated navigation multi-sensor information.

Preferably, the navigation and positioning system for an underwater glider has two operating states: an underwater working state and an up floating error correction state; if a navigation and positioning error is too large, the glider stops working in real time and switches from the underwater working state to the up floating error correction state; and when velocity and location errors of a GPS/INS integrated navigation system are smaller than specified thresholds, the glider switches from the up floating error correction state to the underwater working state and continues to work.

Preferably, for underwater operation, signals output by the MEMS-IMU and the triaxial magnetometer are used for performing navigation and positioning of the glider by using a quaternion algorithm based on complementary filtering.

Preferably, for up floating error correction, signals output by the GPS receiving module and the MEMS-IMU are used for performing navigation and positioning of the glider by using the loose integrated navigation system for correction of GPS/INS location and velocity errors to perform navigation and positioning of the glider, where an Ha) Kalman filter algorithm based on an adaptive multiple fading factor is used as the integrated navigation filter algorithm: $P_{k|k-1} = S_k \Phi_{k|k-1} P_{k-1} \Phi_{k|5-1}{}^T S_k{}^T + Q_{k-1}$; and an H∞ filter gain matrix is $K_k = P_{k|k-1} H_k{}^T (H_k P_{k|k-1} H_k{}^T + I)^{-1}$, and an H∞ filter state optimal covariance matrix is $$P_k = P_{k|k-1} - \Phi_{k|k-1} P_{k|k-1} [\, H_k^T \quad L_k^T \,] R_{e,k}^{-1} \begin{bmatrix} H_k \\ L_k \end{bmatrix} P_{k|k-1} \Phi_{k|k-1}^T,$$

where k and k-1 represent a current moment and a previous moment respectively, $\Phi_{k|k-1}$ is a state-transition matrix, is an observation matrix, $Q_{k-1}$ is a system noise covariance, $S_k$ is an adaptive multiple fading factor matrix, $L_k$ is an estimate of a linear combination of system state variables, I is a unit matrix $$R_{e,k} = \begin{bmatrix} I & 0 \\ 0 & -\gamma^2 I \end{bmatrix} + \begin{bmatrix} H_k \\ L_k \end{bmatrix} P_{k|k-1} [H_k^T \ L_k^T],$$

and γ is an adaptive threshold.

Preferably, the adaptive multiple fading factor matrix $S_k=$diag $(s_1, s_2, s_3 \ldots, s_n)$ is calculated by using the following formula:

$$s_i = \begin{cases} \max\left(1, \sqrt{\frac{[v_i(k)]^2}{\lambda_i^2 j_{ii}(k)\varepsilon_i} - \frac{b_{ii}(k)}{j_{ii}(k)}}\right), & \text{observable variables} \\ 1, & \text{unobservable variables} \end{cases}$$

where $\lambda_i$ is the $i^{th}$ observation element of the observation matrix $H_k$, $K_{ii}$ (k) is the $i^{th}$ diagonal element of the matrix $J_k=\Phi_{k|k-1}P_{k-1}\Phi_{k|k-1}^T$, $\varepsilon_i$ is a threshold of Chi-square test, $\tau_i$ (k) is the $i^{th}$ diagonal element of an innovation matrix $V_k$, and $b_{ii}$ (k) is the $i^{th}$ diagonal element of a matrix $B_k=H_kQ_{k-1}H_k^T+R_k$.

Preferably, the adaptive threshold is $\gamma=\eta \cdot \gamma_a$, where $$\eta = \frac{V_k^T V_k + \text{Trace}(H_k P_{k|k-1}H_k^T + R_{k-1})}{V_k^T V_k},$$

$\gamma_a=\rho(L_k^T L_k(P_k^{-1}+H_k^T H_k)^{-1})$, Trace( ) represents a matrix trace operation, and ρ( ) represents a spectral radius of a matrix.

An up floating error correction method for a navigation and positioning system for an underwater glider is provided, including the following steps:

(1) determining whether an underwater glider needs to perform an up floating error correction operation or not, and when a heading variation is too large, a velocity variation is too large, or it is manually determined that a navigation and positioning error of the glider is too large, floating, by the glider, up to a water surface, to perform an up floating error correction operation;

(2) receiving, after the glider floats up to the water surface, a longitude and latitude signal, an altitude signal, and a triaxial velocity signal from a global positioning system (GPS) receiving module, and a triaxial acceleration signal and a triaxial angular velocity signal from an inertial measurement unit (IMU), and applying an H∞ Kalman filter algorithm based on an adaptive multiple fading factor to a loose integrated navigation system for correction of GPS/INS location and velocity errors, to perform data fusion; and (3) reducing, through step (2), velocity and location errors of the integrated navigation system gradually to approach zero, and if the errors are smaller than specified thresholds, indicating that the up floating error correction is completed, switching, by the glider, to an underwater working state.

Beneficial effects: In the present invention, the navigation and positioning system for an underwater glider completes calculation of an attitude, a velocity, and a location of an underwater glider by using a MEMS-IMU and a triaxial magnetometer that have low costs when the glider is in an underwater working state, and performs multi-sensor data fusion by using a high-precision GPS module and the MEMS-IMU, to reduce a navigation and positioning error of the glider, when the glider is in an up floating error correction state. Switching conditions and requirements of the two states of an underwater glider can be set by software and hardware according to specific work and tasks. Because during an up floating error correction process of the glider, impact from external indeterminacy on the process is unknown, and in addition, statistic characteristics of noise and a system model are time-varying, an H∞) Kalman filter algorithm based on an adaptive multiple fading factor is used in the present invention, and the present invention is adaptive to a multi-sensor data fusion algorithm in a time-varying condition, and can ensure stability and precision of up floating error correction to satisfy requirements. The present invention overcomes the problem that an underwater glider cannot continuously normally work because of reduction of navigation precision and divergence of positioning caused by a conventional integrated navigation algorithm during up floating error correction of the underwater glider under extremely severe conditions, thereby finally achieving accurate positioning of the underwater glider.

DETAILED DESCRIPTION OF THE EMBODIMENTS

Figure 1:
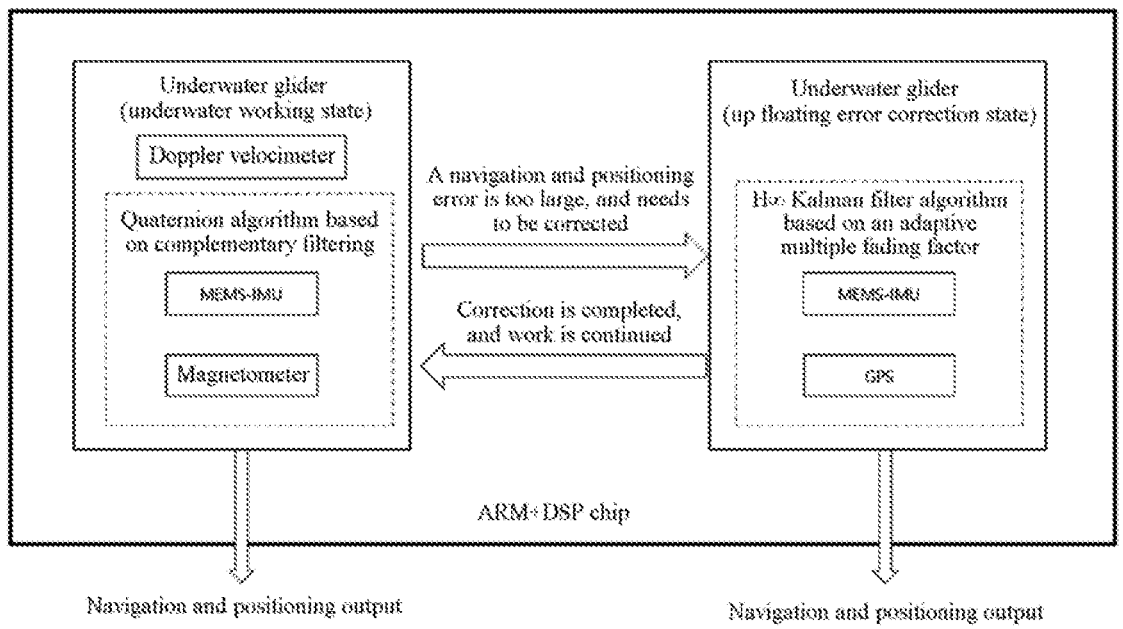
FIG. 1 is a schematic diagram showing a structure of a navigation and positioning system for an underwater glider and a transition between underwater working and up floating error correction states in an embodiment of the present invention.

The present invention is further described with reference to the accompanying drawings and specific embodiments:

As shown in FIG. the present invention discloses a navigation and positioning system for an underwater glider, including a micro-electro-mechanical system inertial measurement unit (MEMS-IMU), a global positioning system (GPS) receiving module, a triaxial magnetometer, a Doppler velocimeter (DVL), a digital signal processing (DSP) module, and an advanced reduced instruction set microprocessor (ARM).

The MEMS-IMU integrates a triaxial accelerometer and a triaxial gyroscope, and triaxial acceleration and angular rate information are output for obtaining navigation information including an attitude, a velocity, and a location of an underwater glider by using an inertial navigation algorithm. In addition, during up floating error correction, data fusion is performed on the navigation information and a GPS signal, to correct a navigation and positioning error.

The triaxial magnetometer is used for a complementary filter algorithm, to correct a heading information error of the glider. In addition, if a heading variation is too large, reflecting strong magnetic interference, an up floating error correction operation needs to be performed.

The DVL is configured to determine a motion state of the underwater glider. If a velocity variation is too large, reflecting that the glider is severely affected by ocean current surges, the up floating error correction operation also needs to be performed.

The GPS receiving module is used for fusion with IMU data by using the designed H∞ Kalman filter algorithm based on an adaptive multiple fading factor during the up floating error correction operation of the glider, to correct velocity and location errors of the glider.

The ARM and the DSP constitute an integrated navigation hardware processing system of the underwater glider. In an underwater working state, the ARM is configured to receive, process, and perform clock synchronization on signals from the magnetometer, the IMU, and the DVL. The DSP is used for calculation of a quaternion algorithm of inertial navigation. In an up floating error correction state, the ARM is configured to receive, process, and perform clock synchronization on signals from the GPS receiving module and the IMU. The DSP is configured to perform calculation of the H∞ Kalman filter algorithm based on an adaptive multiple fading factor.

The present invention discloses an up floating error correction method for a navigation and positioning system for an underwater glider, including the following steps:

(1) Calculate an attitude, a velocity, and a location of an underwater glider by using a quaternion algorithm based on complementary filtering if a navigation and positioning system for the underwater glider starts a MEMS-IMU and a magnetometer module when the system is in an underwater working state. For a basic quaternion algorithm, refer to the book "Inertial Navigation" edited by Professor Qin Yongyuan, and for the complementary filter theory, refer to the invention patent written by Professor Chen Xiyuan, "COMPLEMENTARY FILTERING-BASED UNDERWATER GLIDER ENERGY SAVING ALGORITHM".

(2) Determine whether the underwater glider needs to perform an up floating error correction operation. Motion of the underwater glider is not intensive during a working process. If a heading variation is too large (strong magnetic interference), a velocity variation is too large (large ocean current surges), or it is manually determined that a navigation and positioning error of the glider is too large, the glider floats up to a water surface, to perform the up floating error correction operation.

Figure 2:
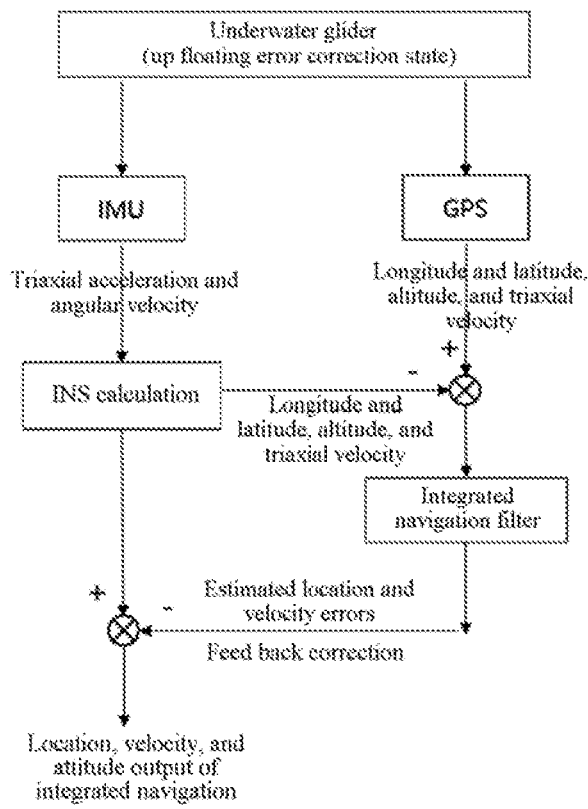
FIG. 2 is a block diagram of a loose integrated navigation system for correction of GPS/INS location and velocity errors in an embodiment of the present invention.

(3) Receive, after the glider floats up to the water surface, a longitude and latitude signal, an altitude signal, and a triaxial velocity signal from a GPS receiving module, and a triaxial acceleration signal and a triaxial angular velocity signal from an IMU by using an ARM+DSP integrated navigation hardware processing system. The DSP performs data fusion on the received multi-sensor signals. On the basis of ensuring reliability and precision of the MEMS-IMU and the GPS receiving module, a designed H∞ Kalman filter algorithm based on an adaptive multiple fading factor is used. The algorithm is applied to a loose integrated navigation system for correction of GPS/INS location and velocity errors shown in FIG. 2, to perform data fusion. In the up floating error correction process of the glider, the triaxial acceleration information and the triaxial angular velocity information output by the IMU are calculated by an inertial navigation system to obtain a location, a velocity, and an attitude of the glider. The GPS system directly outputs the location and the velocity of the glider. Differences between information (location and velocity) output by the GPS system and information output by the INS system separately are obtained and input into an integrated navigation filter as external observation variables. With continuous iterations of the filter, optimal state variables (location and velocity errors) of the integrated navigation system are output for correcting a navigation location and a navigation velocity that include various noise and errors (an attitude error cannot be corrected in a loose integration mode).

Figure 3:
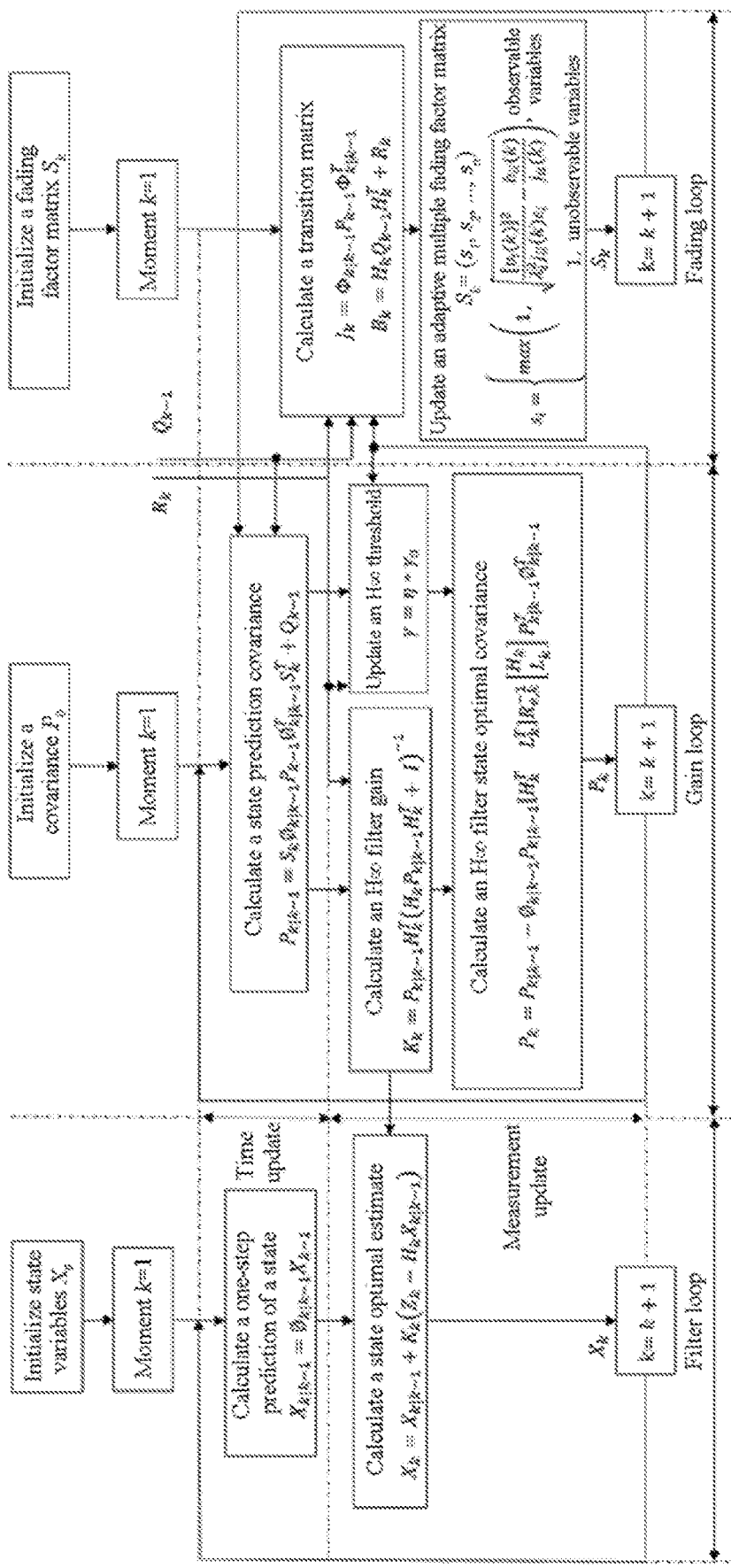
FIG. 3 is a flowchart of an H∞ Kalman filter algorithm based on an adaptive multiple fading factor for an up floating error correction state of an underwater glider in an embodiment of the present invention.

In the up floating error correction, a flowchart of an adopted H∞ Kalman filter algorithm based on an adaptive multiple fading factor is shown in FIG. 3 and includes the following specific steps:

①. Establish an adaptive fading factor

An integrated navigation system is considered as a linear dynamic system:

$$X_k = \Phi_{k|k-1} X_{k-1} \pm W_{k-1}$$

$$Z_k = H_k x_k + v_{k-1}$$

where $X_k$ is a system state variable of a moment k, $\Phi_{k|k-1}$ is a state transition matrix, and is system noise, $Z_k$ is a system observation variable of the moment k, $H_k$ is an observation matrix and $v_{k-1}$ is observation noise. In addition, an expectation and a covariance of noise are as follows:

$$E(W_{k-1}) = 0, \text{var}(W_{k-1}) = Q_{k-1}$$

$$E(V_{k-1}) = 0, \text{var}(V_{k-1}) = R_{k-1}$$

For a fading factor-based Kalman filter algorithm, refer to "ADAPTIVE ESTIMATION OF MULTIPLE FADING FACTORS IN KALMAN FILTER FOR NAVIGATION APPLICATIONS" by Yanrui Geng. The specific adaptive fading factor-based Kalman filter equation is written as:

$$X_k = \Phi_{k|k-1} X_{k-1}$$

$$P_{k|k-1} = S_k \Phi_{k|k-1} P_{k-1} \Phi_{k|k-1}^T S_k^T + Q_{k-1}$$

$$K_k = P_{k|k-1} H_k^T (H_k P_{k|k-1} H_k^T + R_1$$

$$V_k = Z_k - H_k X_{k|k-1}$$

$$X_k = X_{k|k-1} + K_k V_k$$

where $P_{k|k-1}$ is a state prediction covariance matrix, and $K_k$ is a gain matrix, where a gain factor is obtained by synthesizing the indeterminacy of a state space and the indeterminacy of the observation space, and the gain factor decides a correction capability of an external observation variable to the whole system. $V_k$ is an innovation matrix and represents a difference between an external observation variable $Z_k$, and a state variable $X_{k|k-1}$ of system prediction. Compared with the standard Kalman filter equation, only a fading factor matrix $S_k$ is added, for resolving the problem that when a mathematical model established for a research object cannot truly reflect an actual physical process and lacks knowledge of statistical characteristics of system noise, modeling does not match an obtained measured value, and it is likely to cause filter divergence. An adaptive fading factor matrix $S_k$ is obtained by using the following algorithm:

$$S_k = \text{diag}(s_1, s_2, s_3 \ldots, s_n)$$

$$s_i = \begin{cases} \max\left(1, \sqrt{\dfrac{[v_i(k)]^2}{\lambda_i^2 j_{ii}(k)\varepsilon_i} - \dfrac{b_{ii}(k)}{j_{ii}(k)}}\right), & \text{observable variables} \\ 1, & \text{unobservable variables} \end{cases}$$

where $\lambda_i$ is the $i^{th}$ observation element of the observation matrix $H_k$, $k_{ii}(k)$ is the $i^{th}$ diagonal element of the matrix $J_k = \Phi_{k|k-1} P_{k-1} \Phi_{k|k-1}^T$, $\varepsilon_i$ is a threshold of Chi-square test, $v_i(k)$ is the $i^{th}$ diagonal element of an innovation matrix $V_k$, and $b_{ii}$ is the $i^{th}$ diagonal element of a matrix $B_k = H_k Q_{k-1} H_k^T + R_k$. It should be noted that fading factor calculation can only be performed on observable state variables of an observation equation. Otherwise, the observation equation degenerates into the standard Kalman filter equation.

②. Adaptive H∞ Kalman filter algorithm

A linear discrete system is considered:

$$\begin{cases} x_k = \Phi_{k|k-1} x_{k-1} + w_{k-1} \\ y_k = L_k x_k \\ z_k = H_k x_k + v_{k-1} \end{cases}$$

where $L_k$ is an estimate of a linear combination of system state variables and is often taken as I, and $Y_k$ represents a direct estimate of the state variable $X_k$.

Therefore, a constructed construction cost function J is as follows:

$$J = \frac{\sum_{k=1}^{N} \|y_k - \hat{y}_k\|^2}{\|x_0 - \hat{x}_0\|_{P_0^{-1}}^2 + \sum_{k=1}^{N} \left( \|w_k\|_{Q_k^{-1}}^2 + \|v_k\|_{R_k^{-1}}^2 \right)}$$

where N is an overall filter time limit, $X_0$ is an initial state variable of the system, and the remaining have been introduced. The central idea of H∞ filtering is to ensure that an H∞ norm of the construction cost function J is the minimum, to ensure that a maximum energy gain from an interference signal to an estimated error is the minimum. Therefore, impact of external disturbance and model indeterminacy on system output is minimized.

$$\min \|J\|_\infty = \gamma_n$$

However, because a closed solution to an H∞ optimal estimation problem can only be obtained in some special cases, a design of H∞ suboptimal filtering is usually considered. That is, a threshold $\gamma$ that is sufficiently close to $\gamma_0$ is given provided that an H∞ norm of a constructed algebraic function is smaller than $\gamma$.

In a case of full rank of $\Phi_{k|k-1}$, sufficient and necessary conditions for existence of a solution to the H∞ suboptimal problem can be given by using a Riccati inequality:

$$P_k^{-1} + H_k^T - \gamma^{-2} L_k^T L_k > 0$$

where $P_k$ is an optimal covariance estimate of a system state variable $X_k$.

It should be noted that robustness of a filter is related to a selected threshold $\gamma$. If the threshold $\gamma$ is smaller and closer to $\gamma_0$, robustness of the filter is stronger. However, $\gamma$ should not be smaller than $\gamma_0$. Otherwise, there is no solution to the H∞ suboptimal problem, resulting in filter divergence. In addition, if $\gamma$ approaches infinity, an H∞ filter degenerates to a conventional Kalman filter. A conventional threshold $\gamma$ is usually determined according to actual working experience of a glider and cannot be changed. As a result, filtering effects are more conservative. It cannot be guaranteed that an estimated error of a system is relatively small while having high robustness. Therefore, if a value of the threshold $\gamma$ is adaptive to different up floating error correction environments of the underwater glider, navigation and positioning precision of the up floating error correction can be further improved while guaranteeing robustness. Therefore, an adaptive algorithm of the threshold $\gamma$ is established according to the Riccati inequality as follows:

$$\gamma^2 > \rho(L_k^T L_k (P_k^{-1} + H_k^T H_k)^{-1})$$

where $\rho(\ )$ represents a spectral radius of a matrix. If $\gamma_a = \rho(L_k^T L_k (P_k^{-1} + H_k^T H_k)^{-1})$, because an optimal state estimate covariance $P_k$ is continuously updated in the filter iterations, the optimal state estimate covariance $P_k$ is a time-varying factor.

Ideally, an innovation matrix of Kalman filtering is $V_k$, $\sim N(0, H_k P_{k|k-1} H_k^T + R_{k-1})$. However, impact of system indeterminacy leads to an abnormal observation variable, causing a filter to be out of order. Such a case may cause a variation of $V_k^T V_k$ of a sum of squares of an innovation sequence. When $V_k^T V_k$ is relatively large, reflecting that interference of indeterminacy has large impact on the system, in this case, robustness of the system should be increased (the threshold $\gamma$ should be reduced). On the contrary, when $V_k^T V_k$ is relatively small, reflecting that the interference is relatively small, in this case, more attention should be paid to navigation and positioning precision of the system (the threshold $\gamma$ should be increased). The adaptive threshold $\gamma$ is:

$$\gamma = \eta \cdot \gamma_a,$$

$$\text{where } \eta = \frac{V_k^T V_k + \text{Trace} + (H_k P_{k|k-1} H_k^T + R_{k-1})}{V_k^T V_k}$$

where Trace $(H_k P_{k|k-1} H_k^T + R)$ is a trace operation, that is, a sum of diagonal elements of the matrix is obtained.

Differences from a standard Kalman filter equation are as follows:

$$K_k = P_{k|k-1} H_k^T (H_k P_{k|k-1} H_k^T + I)^{-1}$$

$$P_k = P_{k|k-1} - \Phi_{k|k-1} P_{k|k-1} [H_k^T \ L_k^T] R_{e,k}^{-1} \begin{bmatrix} H_k \\ L_k \end{bmatrix} P_{k|k-1} \Phi_{k|k-1}^T$$

$$\text{where } R_{e,k} = \begin{bmatrix} I & 0 \\ 0 & -\gamma^2 I \end{bmatrix} + \begin{bmatrix} H_k \\ L_k \end{bmatrix} P_{k|k-1} [H_k^T \ L_k^T]$$

③. H∞ Kalman filter algorithm based on an adaptive multiple fading factor

Algorithms in steps ① and ② are integrated to form an overall integrated navigation algorithm for up floating error correction of an underwater glider (an H∞ Kalman filter algorithm based on an adaptive multiple fading factor). A flowchart of the algorithm is shown in FIG. 3. An integrated navigation filter is divided into three loops (a filter loop, a gain loop, and a fading loop) for calculation. A specific process is as follows:

i) First, perform a time update: predict a state variable $X_{k|k-1}$ of the current moment in one step according to an optimal state variable estimate $X_{k-1}$ that is filtered and output at the previous moment, and predict a state prediction covariance $P_{k|k-1}$ of the current moment according to both an optimal covariance estimation matrix $P_{k-1}$ that is filtered and output at the previous moment and a fading factor matrix $S_k$ output by a fading loop.

ii) Second, perform a measurement update: calculate a gain matrix $K_k$ according to the state prediction covariance $P_{k|k-1}$ of the current moment, update a system optimal state variable estimate $X_k$ by using the gain matrix $K^k$ and the state variable $X_{k|k-1}$ predicted in one step after receiving a new external observation variable, and then, calculate an H∞ filter state optimal covariance $P_k$ after calculating an H∞ threshold γ according to $P_{k|k-1}$ and a time-varying factor $\gamma_a$.

iii) Finally, perform a fading factor update: calculate the adaptive multiple fading factor matrix $S_k$ after updating a transition matrix of the fading loop according to the H∞ filter state optimal covariance $P_k$.

(4) Reduce, by using an H∞ Kalman filter algorithm based on an adaptive multiple fading factor, velocity and location errors of the integrated navigation system gradually to approach zero. If the errors are smaller than specified thresholds, indicating that the up floating error correction is completed, the glider can switch to an underwater working state.

What is claimed is:

1. A navigation and positioning system for an underwater glider, comprising a micro-electro-mechanical system inertial measurement unit (MEMS-IMU), a global positioning system (GPS) receiving module, a triaxial magnetometer, a Doppler velocimeter (DVL), and an integrated navigation hardware processing system, wherein
the MEMS-IMU integrates a triaxial accelerometer and a triaxial gyroscope, and triaxial acceleration and angular rate information are output for obtaining navigation information comprising an attitude, a velocity, and a location of the underwater glider by using an inertial navigation algorithm;
the triaxial magnetometer is configured to correct a heading information error of the underwater glider, and the DVL is configured to determine a motion state of the underwater glider;
the GPS receiving module is combined with the MEMS-IMU to form an integrated navigation system for a correction of GPS/inertial navigation system (INS) location and velocity errors in an up floating error correction operation, and the GPS receiving module is configured to correct velocity and location errors of the underwater glider by using an integrated navigation filter algorithm; and
the integrated navigation hardware processing system is configured to receive, process, and perform a clock synchronization on signals from the triaxial magnetometer, the GPS receiving module, the MEMS-IMU, and the DVL, and perform an algorithm calculation of integrated navigation multi-sensor information; and
wherein further, the navigation and positioning system has an underwater working state and an up floating error correction state;
if a navigation and positioning error is large, the underwater glider stops working in real time and switches from the underwater working state to the up floating error correction state; and
when velocity and location errors of a GPS/INS integrated navigation system are smaller than specified thresholds, the underwater glider switches from the up floating error correction state to the underwater working state and continues to works,
wherein for up floating error correction, signals output by the GPS receiving module and the MEMS-IMU are used for performing a navigation and a positioning of the underwater glider by using the integrated navigation system for the correction of the GPS/INS location and the velocity errors, wherein an H∞ Kalman filter algorithm based on an adaptive multiple fading factor is used as the integrated navigation filter algorithm; and
a state prediction covariance matrix of the H∞ Kalman filter algorithm is $P_{k|k-1}=S_k\Phi_{k|k-1}P_{k-1}\Phi_{k|5-1}{}^T S_k{}^T+Q_{k-1}$, an H∞ filter gain matrix is $K_k=P_{k|k-1}H_k{}^T(H_k P_{k|k-1}H_k{}^T+I)^{-1}$, and
an H∞ filter state optimal covariance matrix is $$P_k = P_{k|k-1} - \Phi_{k|k-1}P_{k|k-1}[H_k^T \quad L_k^T]R_{e,k}^{-1}\begin{bmatrix}H_k\\L_k\end{bmatrix}P_{k|k-1}\Phi_{k|k-1}^T,$$

wherein k and k-1 represent a current moment and a previous moment respectively, $\Phi_{k|k-1}$ is a state-transition matrix, $H^k$ is an observation matrix, $Q_{k-1}$ is a system noise covariance, $S_k$ is an adaptive multiple fading factor matrix, $L_k$ is an estimate of a linear combination of system state variables, $\lambda_i$ is a unit matrix, $$R_{e,k} = \begin{bmatrix}I & 0\\0 & -\gamma^2 I\end{bmatrix} + \begin{bmatrix}H_k\\L_k\end{bmatrix}P_{k|k-1}[H_k^T \quad L_k^T],$$

and γ is an adaptive threshold, and
wherein the adaptive multiple fading factor matrix $S_k$=diag $(s_1, s_2, s_3 \ldots, s_n)$ is calculated by using the following formula:

$$s_i = \begin{cases}\max\left(1, \sqrt{\frac{[v_i(k)]^2}{\lambda_i^2 j_{ii}(k)\varepsilon_i} - \frac{b_{ii}(k)}{j_{ii}(k)}}\right), & \text{observable variables}\\1, & \text{unobservable variables}\end{cases},$$

wherein $\lambda_i$ is an $i^{th}$ observation element of the observation matrix $H_k$ $j_{ii}$ (k) is an $i^{th}$ diagonal element of a matrix $J_k=\Phi_{k|k-1}P_{k-1}\Phi_{k|k-1}{}^T$ $\varepsilon_i$ is a threshold of a Chi-square test, $v_i$ (k) is an $i^{th}$ diagonal element of an innovation matrix $V_k$ and $b_{ii}$ (k) is an $i^{th}$ diagonal element of a matrix $B_k=H_k Q_{k-1}H_k{}^T+R_k$
wherein the adaptive threshold is $\gamma=f\cdot\gamma_a$, wherein $$\eta = \frac{V_k^T V_k + \text{Trace}(H_k P_{k|k-1}H_k^T + R_{k-1})}{V_k^T V_k},$$

$\gamma_a=\rho(L_k{}^T L_k(\beta_k{}^{-1}+H_k{}^T H_k)^{-1})$ Trace( ) represents a matrix trace operation, and ρ( ) represents a spectral radius of a matrix.

2. The navigation and positioning system according to claim 1, wherein for an underwater operation, signals output by the MEMS-IMU and the triaxial magnetometer are used for performing a navigation and a positioning of the underwater glider by using a quaternion algorithm based on complementary filtering.

3. An up floating error correction method for a navigation and positioning system for an underwater glider, comprising the following steps:
(1) determining whether an underwater glider needs to perform an up floating error correction operation or not, and when a heading variation is large, a velocity variation is large, or manually determining that a navigation and positioning error of the underwater glider is large, floating, by the underwater glider, up to a water surface, to perform the up floating error correction operation;
(2) receiving, after the underwater glider floats up to the water surface, a longitude and latitude signal, an altitude signal, and a triaxial velocity signal from a global positioning system (GPS) receiving module, and a triaxial acceleration signal and a triaxial angular velocity signal from an inertial measurement unit (IMU), and applying an H∞ Kalman filter algorithm based on an adaptive multiple fading factor to an integrated navigation system for a correction of GPS(global positioning system)/inertial navigation system (INS) location and velocity errors, to perform a data fusion; and (3) reducing, through step (2), velocity and location errors of the integrated navigation system gradually to approach zero, and if the velocity and location errors are smaller than specified thresholds, indicating that the up floating error correction is completed, switching, by the underwater glider, to an underwater working state, wherein a state prediction covariance matrix of the H∞ Kalman filter algorithm based on the adaptive multiple fading factor is $P_{k|k-1}=S_k\Phi_{k|k-1}P_{k-1}\Phi_{k|5-1}{}^T S_k{}^T+Q_{k-1}$, an H∞ filter gain matrix is $K_k=P_{k|k-1}H_k{}^T(H_k P_{k|k-1}H_k{}^T+I)^{-1}$ and an H∞ filter state optimal covariance matrix is $$P_k = P_{k|k-1} - \Phi_{k|k-1}P_{k|k-1}[H_k^T \; L_k^T]R_{e,k}^{-1}\begin{bmatrix}H_k\\L_k\end{bmatrix}P_{k|k-1}\Phi_{k|k-1}^T,$$

wherein k and k-1 represent a current moment and a previous moment respectively, $\Phi_{k|k-1}$ is a state-transition matrix, $H_k$ is an observation matrix, $Q_{k-1}$ is a system noise covariance, $S_k$ is an adaptive multiple fading factor matrix, $L_k$ is an estimate of a linear combination of system state variables, I is a unit matrix, $$R_{e,k} = \begin{bmatrix}I & 0\\0 & -\gamma^2 I\end{bmatrix} + \begin{bmatrix}H_k\\L_k\end{bmatrix}P_{k|k-1}[H_k^T \; L_k^T],$$

and $\gamma$ is an adaptive threshold, wherein the adaptive multiple fading factor matrix $S_k$=diag $(s_1, s_2, s_3 \ldots, s_n)$ is calculated by using the following formula:

$$s_i = \begin{cases}\max\left(1, \sqrt{\frac{[v_i(k)]^2}{\lambda_i^2 j_{ii}(k)\varepsilon_i} - \frac{b_{ii}(k)}{j_{ii}(k)}}\right), & \text{observable variables}\\1, & \text{unobservable variables}\end{cases}$$

wherein $\lambda_i$ is an $i^{th}$ observation element of the observation matrix $H_k$-$j_{ii}$ (k) is an $i^{th}$ diagonal element of a matrix is a $J_k=\Phi_{k|k-1}P_{k-1}\Phi_{k|k-1}{}^T\varepsilon_i$ threshold of a Chi-square test, $u_i$ (k) is an $i^{th}$ diagonal element of an innovation matrix $V_k$, and $b_{ii}$ (k) is an $i^{th}$ diagonal element of a matrix $B_k=H_k Q_{k-1}H_k{}^T+R_k$ wherein the adaptive threshold is $\gamma=f\cdot\gamma_a$, wherein $$\eta = \frac{V_k^T V_k + \text{Trace}(H_k P_{k|k-1}H_k^T + R_{k-1})}{V_k^T V_k},$$

$\gamma_a=\rho(L_k{}^T L_k(P_k{}^{-1}+H_k{}^T H_k)^{-1})$, Trace( ) represents a matrix trace operation, and $\rho$( ) represents a spectral radius of a matrix.

4. The up floating error correction method according to claim 3, wherein a calculation process of the H∞ Kalman filter algorithm based on the adaptive multiple fading factor comprises:

first, performing a time update, specifically comprising: predicting a state variable $X_{k|k-1}==\Phi_{k|k-1}X_{k-1}$ of the current moment in one step according to an optimal state variable estimate $X_{k-1}$ filtered and output at the previous moment, and predicting a state prediction covariance $P_{k|k-1}=S_k\Phi_{k|k-1}P_{k-1}\Phi_{k|5-1}{}^T S_k{}^T+Q_{k-1}$ of the current moment according to both an optimal covariance estimation matrix $P_{k-1}$ filtered and output at the previous moment and the adaptive multiple fading factor matrix $S_k$ output by a fading loop;

second, performing a measurement update, specifically comprising: calculating the H∞ filter gain matrix $K_k=P_{k|k-1}H_k{}^T(H_k P_{k|k-1}H_k{}^T+I)^{-1}$ according to the state prediction covariance $P_{k|k-1}$ of the current moment, updating a system optimal state variable estimate $X_k$ by using the H∞ filter gain matrix $K_k$ and the state variable $X_{k|k-1}$ predicted in one step after receiving a new external observation variable, and then, calculating the H∞ filter state optimal covariance matrix $$P_k = P_{k|k-1} - \Phi_{k|k-1}P_{k|k-1}[H_k^T \; L_k^T]R_{e,k}^{-1}\begin{bmatrix}H_k\\L_k\end{bmatrix}P_{k|k-1}\Phi_{k|k-1}^T$$

after calculating an H∞ threshold $\gamma$ according to $P_{k|k-1}$ and a time-varying factor $\gamma_a$; and finally, performing a fading factor update, specifically comprising: calculating the adaptive multiple fading factor matrix $S_k$=diag $(s_1, s_2, s_3 \ldots, s_n)$ after updating a transition matrix of the fading loop according to the H∞ filter state optimal covariance matrix 1, unobservable variables.

\* \* \* \* \*